US010112706B2

(12) United States Patent
Sopper et al.

(10) Patent No.: US 10,112,706 B2
(45) Date of Patent: Oct. 30, 2018

(54) UNMANNED AERIAL VEHICLES FOR COLLABORATION

(71) Applicant: X Development LLC, Mountain View, CA (US)

(72) Inventors: Clark Sopper, Redwood City, CA (US); Adam Woodward, Santa Clara, CA (US); Clayton Woodward Bavor, Jr., Atherton, CA (US)

(73) Assignee: X Development LLC, Mountain View, CA (US)

( * ) Notice: Subject to any disclaimer, the term of this patent is extended or adjusted under 35 U.S.C. 154(b) by 0 days.

(21) Appl. No.: 15/226,786

(22) Filed: Aug. 2, 2016

(65) Prior Publication Data

US 2017/0029098 A1 Feb. 2, 2017

Related U.S. Application Data

(63) Continuation of application No. 14/635,942, filed on Mar. 2, 2015, now Pat. No. 9,409,645.

(51) Int. Cl.
*B64C 27/08* (2006.01)
*B64C 39/02* (2006.01)
(Continued)

(52) U.S. Cl.
CPC ............ *B64C 27/08* (2013.01); *B64C 39/024* (2013.01); *H04L 67/10* (2013.01); *H04N 5/2222* (2013.01);
(Continued)

(58) Field of Classification Search
CPC . B64C 27/08; B64C 39/024; B64C 2201/027; B64C 2201/042;
(Continued)

(56) References Cited

U.S. PATENT DOCUMENTS 5,600,368 A 2/1997 Matthews
6,292,713 B1 9/2001 Jouppi et al.
(Continued)

FOREIGN PATENT DOCUMENTS

WO WO2014080388 A2 † 5/2014
WO WO 2014106814 A2 † 7/2014

OTHER PUBLICATIONS

YouTube Video entitled "Iphone Takes Flight with FaceTime HD 720"; uploaded on Mar. 16, 2011; screenshots included; URL: https://www.youtube.com/watch?v=orA58n8cj9g; retrieved on May 16, 2018.
(Continued)

*Primary Examiner* — Anne M Antonucci
(74) *Attorney, Agent, or Firm* — McDonnell Boehnen Hulbert & Berghoff LLP

(57) ABSTRACT

A mobile telepresence system may include a frame, a propulsion system operably coupled to the frame to propel the frame through a designated space, a screen movably coupled to the frame, and an image output device coupled to the frame. The frame may include a central body defining a longitudinal axis of the frame, a first arm at a first end portion of the central body, and a second arm at a second end portion of the central body, opposite the first end portion of the central body. The propulsion system may include rotors at opposite end portions of the first and second arms which propel the frame in response to an external command. The image output device may project an image onto the screen in response to an external command.

20 Claims, 17 Drawing Sheets

(51) Int. Cl.
  *H04N 7/14* (2006.01)
  *H04L 29/08* (2006.01)
  *H04N 5/222* (2006.01)

(52) U.S. Cl.
  CPC ....... *H04N 7/142* (2013.01); *B64C 2201/027* (2013.01); *B64C 2201/042* (2013.01); *B64C 2201/127* (2013.01)

(58) Field of Classification Search
  CPC . B64C 2201/127; H04L 67/10; H04N 5/2222; H04N 7/142
  USPC .......................................................... 701/2
  See application file for complete search history.

(56) References Cited

U.S. PATENT DOCUMENTS

| | | | |
|---|---|---|---|
| 8,306,664 B1 | 11/2012 | Wiley et al. | |
| 8,983,662 B2 | 3/2015 | Moore | |
| 9,061,102 B2* | 6/2015 | Levien ................. | G05D 1/0011 |
| 9,174,733 B1* | 11/2015 | Burgess ................. | B64D 1/12 |
| 2014/0046589 A1* | 2/2014 | Metzler ................. | G01B 21/04 |
| | | | 701/514 |
| 2014/0233099 A1* | 8/2014 | Stark ....................... | G09F 21/06 |
| | | | 359/446 |
| 2014/0236388 A1* | 8/2014 | Wong .................... | B64C 39/024 |
| | | | 701/2 |
| 2014/0304107 A1* | 10/2014 | McAllister ........... | G06Q 10/087 |
| | | | 705/26.7 |

OTHER PUBLICATIONS

Graham Dyer: "DIY Carbon H-Frame Quadcopter," Sep. 30, 2012, URL: http://diydrones.com/profiles/blogs/diy-carbon-h-frame-quadcopter.
Hiroki Nozaki. Apr. 26, 2014 Flying display: a movable display pairing projector and screen in the air. In CHI '14 Extended Abstracts on Human Factors in Computing Systems (CHI EA '14). ACM, New York, NY, USA, 909-914. DOI: https://doi.org/10.1145/2559206.2579410.
Stefan Schneegass et al., Apr. 26, 2014, Midair displays: exploring the concept of free-floating public displays. In CHI 14 Extended Abstracts on Human Factors in Computing Systems (CHI EA '14). ACM, New York, NY, USA, 2035-2040. DOI: https://doi.org/10.1145/2559206.2581190.
Chris Armes: "Making the "virtual" come to life", Re Item V Queen's gazette, Nov. 5, 2015, URL:http://www.queensu.ca/gazette/stories/making-virtual-comelife.
International Preliminary Search Report on Patentability dated Sep. 5, 2017 issued in connection with International Application No. PCT/US2016/013422, filed on Jan. 14, 2016, 10 pages.

* cited by examiner
† cited by third party

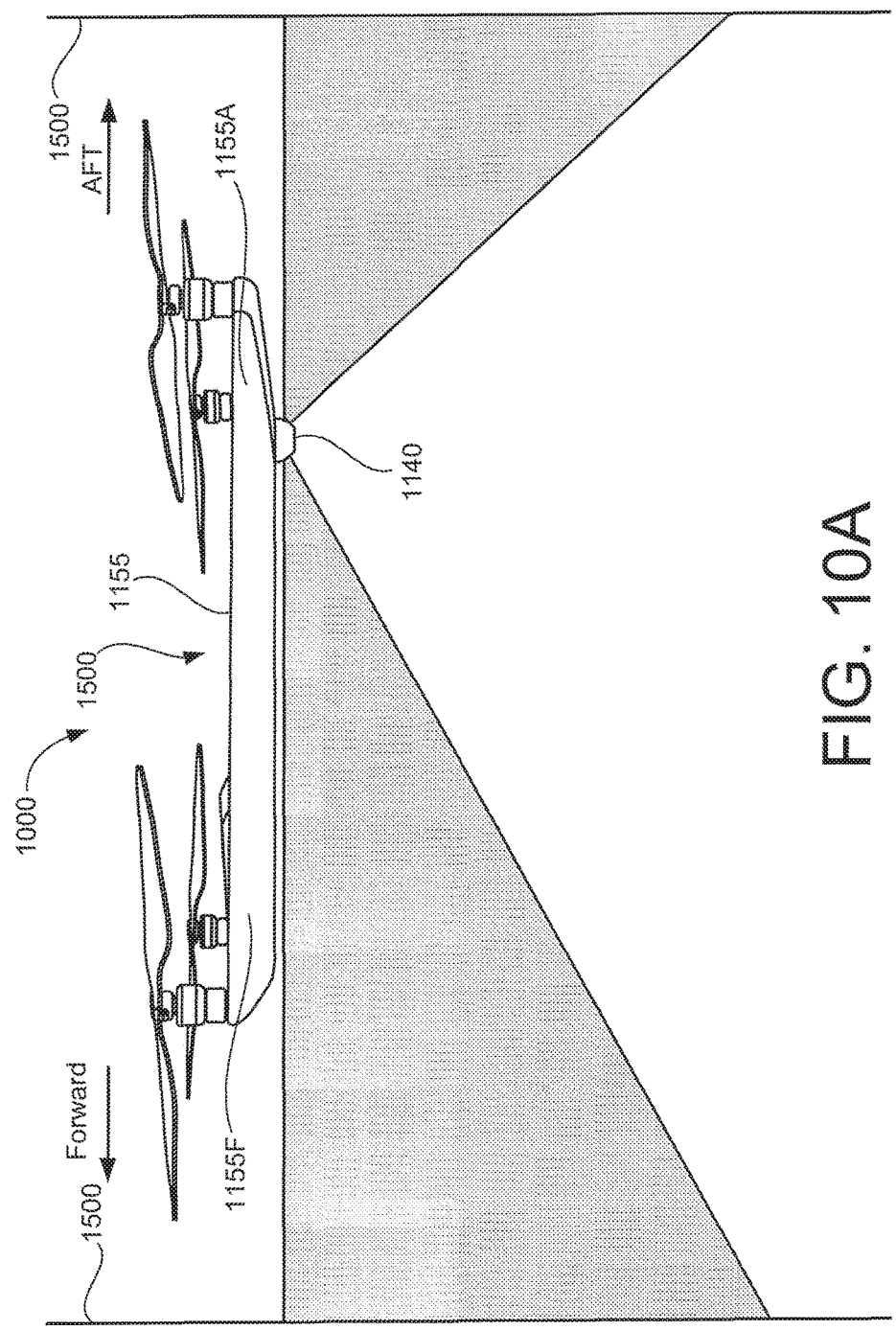

UNMANNED AERIAL VEHICLES FOR COLLABORATION

FIELD

This document relates, generally, to a telepresence device.

BACKGROUND

Telepresence systems may allow a first user at a first, remote location to interface with a second user at a second location, allowing the remote user to feel as if they are present, at the same location as that of the second user. Current telepresence solutions, such as those provided by commercial video teleconferencing systems, may provide multiple users with the ability to interface electronically, using both audio and video feeds. However, this typically involves each of the users being present in an established teleconferencing facility at a fixed location.

SUMMARY

In one aspect, a mobile telepresence system, in accordance with embodiments as broadly described herein may include a frame, including a central body defining a longitudinal axis of the frame, a first arm at a first end portion of the central body and a second arm at a second end portion of the central body, opposite the first end portion of the central body, a propulsion system operably coupled to the frame and configured to propel the frame in response to an external command, a screen movably coupled to the first arm, and an image output device coupled to the frame In another aspect, a mobile telepresence system, in accordance with embodiments as broadly described herein, may include a frame, including a forward arm, an aft arm and a central body extending from a central portion of the forward arm to a central portion of the aft arm, the central body defining a longitudinal axis of the frame, a plurality of rotors operably coupled to the frame and configured to propel the frame in response to an external command, a screen movably coupled to the first arm, an output device operably coupled to the frame and configured to project an image onto the screen, and a controller including a communication module configured to receive signals from the second location and transmit signals to the second location.

The details of one or more implementations are set forth in the accompanying drawings and the description below. Other features will be apparent from the description and drawings, and from the claims.

BRIEF DESCRIPTION OF THE DRAWINGS

FIGS. 3A-3C illustrate a hinged coupling of a screen and a frame of the example quadcopter shown in FIG. 1B, in which FIG. 3A is a side view, FIG. 3B is a rear perspective view, and FIG. 3C is a front perspective view of the hinged coupling of the screen to the frame of the quadcopter, in accordance with embodiments as broadly described herein.

FIGS. 10A-10B are side views of a mobile telepresence system, in accordance with embodiments as broadly described herein.

DETAILED DESCRIPTION

Telepresence systems may provide a remote user with the ability to feel fully present and engaged with one or more participants at another location, physically separate from the location of the remote user. For example, in the case of a meeting held in a designated location, such as, for example, a conference room, a remote user of a telepresence system may be able to interact and engage with the participants in the conference room, from the remote location, including two way audio communication capability and/or two way video communication capability, without being physically in the conference room. A video teleconferencing facility may provide the capability for two way audio and/or video communication between the remote user and the participants in the conference room. However, this may require that the conference room and the remote location be equipped with video teleconferencing equipment, which may be at a fixed location and thus not mobile, which may be relatively expensive to implement and maintain, and which may impact the flexibility of the space in which the equipment is installed. This may somewhat limit the ability of the remote user and the other participants of the meeting in scheduling and conducting meetings.

In some embodiments, a mobile component may provide an additional level of flexibility to a telepresence system, allowing the telepresence system to be moved into and around a plurality of different designated locations as necessary. For example, in one implementation, a mobile telepresence system may be included on a robot which may be remotely navigated by a user, for example, throughout spaces in a work place. Such a telepresence robot may be remotely navigated, for example, through corridors, into and out of offices, conference rooms and other work spaces, and the like. However, the size and energy consumption levels of this type of telepresence robot may hinder its ability to effectively navigate complicated spaces with limited open floor space for the robot to traverse. Additionally, this type of telepresence robot cannot traverse stairs, and would require on-site human intervention to access a work space on a different floor using an elevator.

Figure 1:
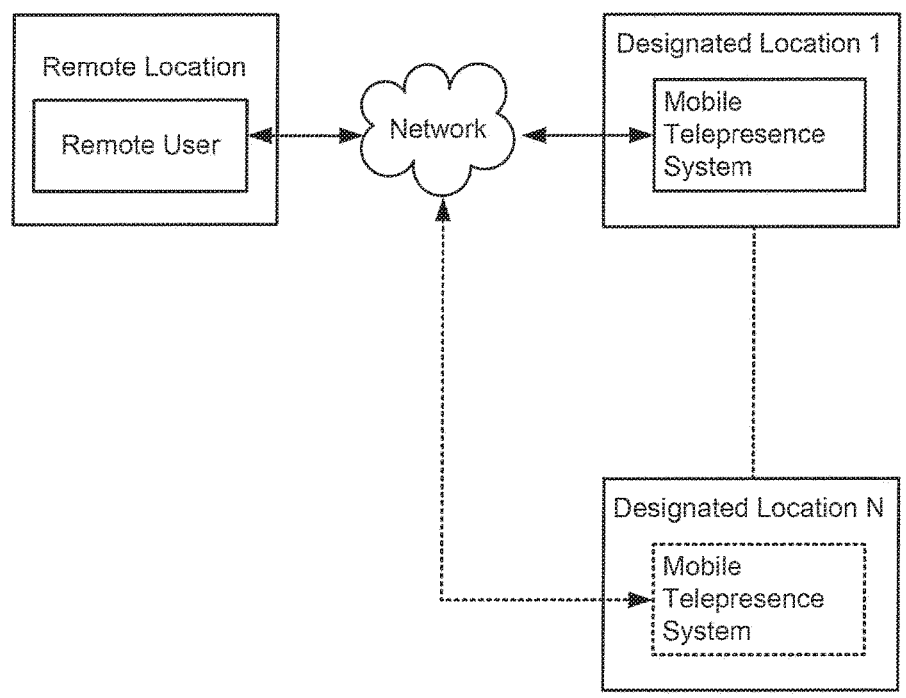
FIG. 1 is an example of an implementation of a mobile telepresence system, in accordance with embodiments as broadly described herein.

As shown in FIG. 1, a remote user at a remote location may communicate with the mobile telepresence system via, for example, a network, to navigate the telepresence system into and around the designated location. The user's remote navigation and control of the mobile telepresence system may allow the user to be fully engaged with participants in the designated location, and to move from one designated location to another, from the remote location.

In some embodiments, a telepresence system may be implemented in, for example, a remotely navigated airborne form of conveyance, such as, for example, a remotely navigated quadcopter or drone. Implementation of a mobile telepresence system on a relatively compact and operationally efficient airborne platform such as a quadcopter may provide significant improvements in, for example, speed, maneuverability, energy consumption and the like, facilitating access to spaces which may be otherwise difficult to access by a larger and less maneuverable platform.

Figure 2:
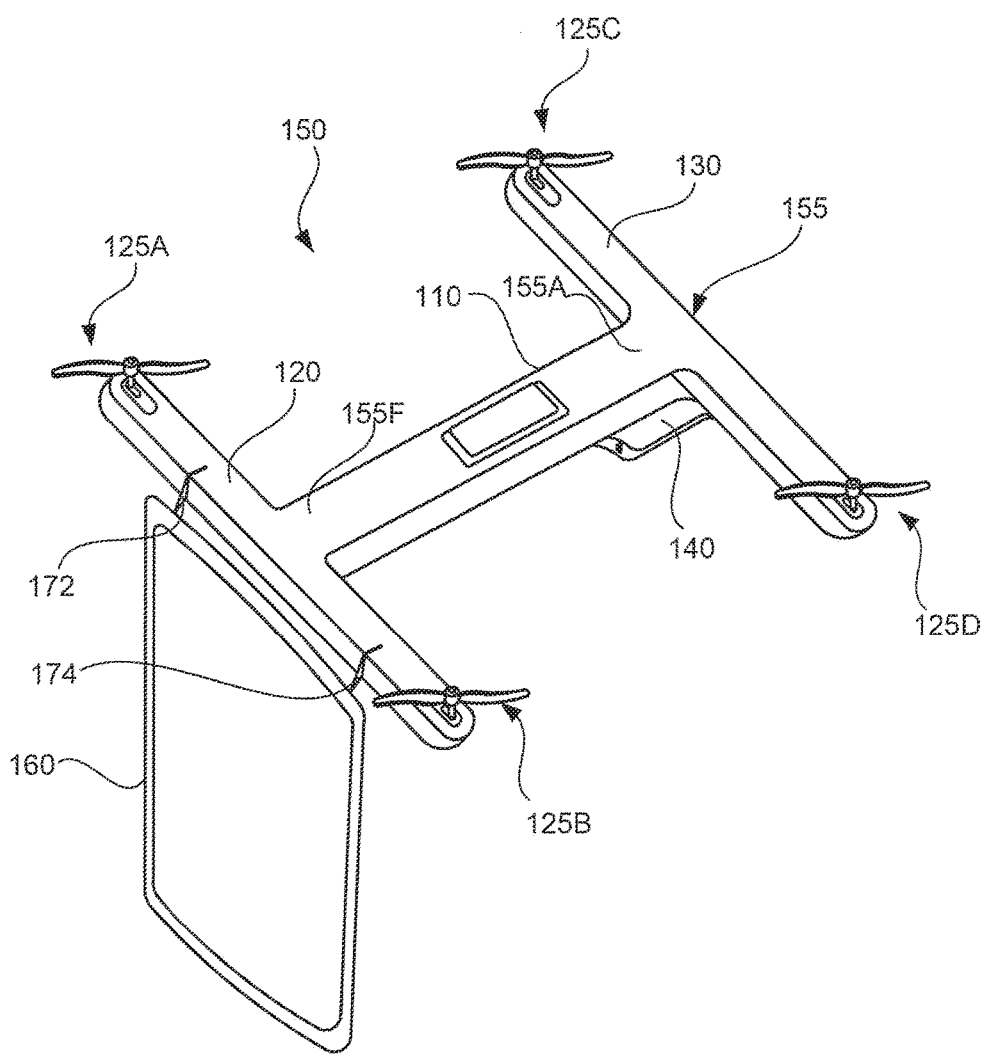
FIG. 2 is a perspective view of a mobile telepresence system, in accordance with embodiments as broadly described herein.

An example implementation of a mobile telepresence system, as embodied and broadly described herein, is shown in FIG. 2. In the embodiment shown in FIG. 2, the telepresence system 100 includes various audio and/or video communication components that are mounted on and/or coupled to and/or integrated into a quadcopter 150. The quadcopter 150 may include, for example, a frame 155 including a central body 110, a first arm 120, at a first, or forward, end of the central body 110, and a second arm 130, at a second, or aft, end of the central body 110. A propulsion system 125, including, for example, a plurality of rotors/propellers 125 (labeled individually as 125A through 125D), may provide a propulsive force for movement of the quadcopter 150. For example, rotors 125A-125D may be rotatably coupled to the first and second arms 120 and 130 to provide propulsive force for movement of the quadcopter 150. In particular, in the embodiment shown in FIG. 2, a first rotor 125A and a second rotor 125B may be rotatably coupled at opposite end portions of the first arm 120, and a third rotor 125C and a fourth rotor 125D may be rotatably coupled at opposite end portions of the second arm 130. Rotative force, blade pitch, and/or hub pitch of the rotors 125A-125D may be varied, independently, simultaneously and/or in coordination, to control speed and direction of the quadcopter 150.

In the quadcopter 150 shown in FIG. 2, the first arm 120 extends outward from the forward end of the central body 110, in a somewhat perpendicular orientation, and the second arm 130 extends outward from the aft end of the central body 110, in a somewhat perpendicular orientation. Thus, the central body 110 and the first and second arms 120 defining the frame 155 of the quadcopter 150 are arranged in an 'H' shape. This 'H' shape may provide an amount of structural rigidity and integrity to support a relatively large screen 160 at a forward end portion 155F of the frame 155, while still able to maintain balanced, stable flight without undue strain on the propulsion system due to the aerodynamic load and weight generated by the screen 160. This 'H' shape may also allow the structure of the frame 155 to be made of relatively light material while still providing structural rigidity and integrity.

An image output device 140 may also be coupled to, or integrated into, the quadcopter 150. In the example implementation shown in FIG. 2, the image output device 140 is positioned at the aft end portion 155A of the quadcopter 150, at a portion of the frame 155 where the central body 110 joins the second arm 130, with the screen 160 provided at the forward end portion 155F of the frame 155, at a portion of the frame 155 where the central body 110 joins the first arm 120, such as, for example, at the first arm 120, opposite the image output device 140. In the example implementation shown in FIG. 2, the forward end portion 155F of the frame 155 of the quadcopter 150 Images processed by the image output device 140, for example, still and/or moving images generated by the remote user for projection into the meeting space, may be projected onto or displayed on a screen 160 coupled to the forward portion of the quadcopter 150, for example, at the first arm 120 of the quadcopter 150. The example implementation shown in FIG. 2 illustrates a rear projection arrangement, in which the image output device 140 projects still and/or moving images onto the screen 160, and in particular, toward an aft surface 160A (see FIGS. 6A-6D) of the screen 160. In this type of arrangement, the screen 160 may be translucent or semi-translucent so that the images projected by the image output device 140 toward the screen 160 may be visible from a front surface 160F (see FIGS. 6A-6D) of the screen 160, essentially through the screen 160. This is just one example of an arrangement of an image output device and screen on a quadcopter which may allow an image of the remote user to be rendered, real time, on the screen and viewed by participants in the meeting space. Other arrangements of the image output device and screen may also be implemented, and will be discussed in more detail below.

Figure 3A:
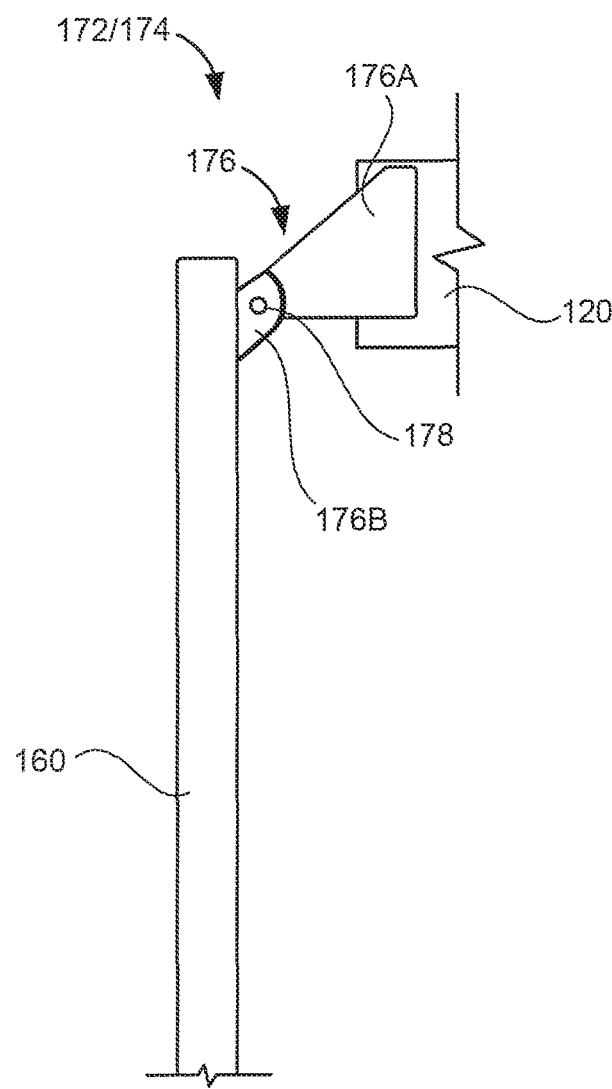
Figure 3B:
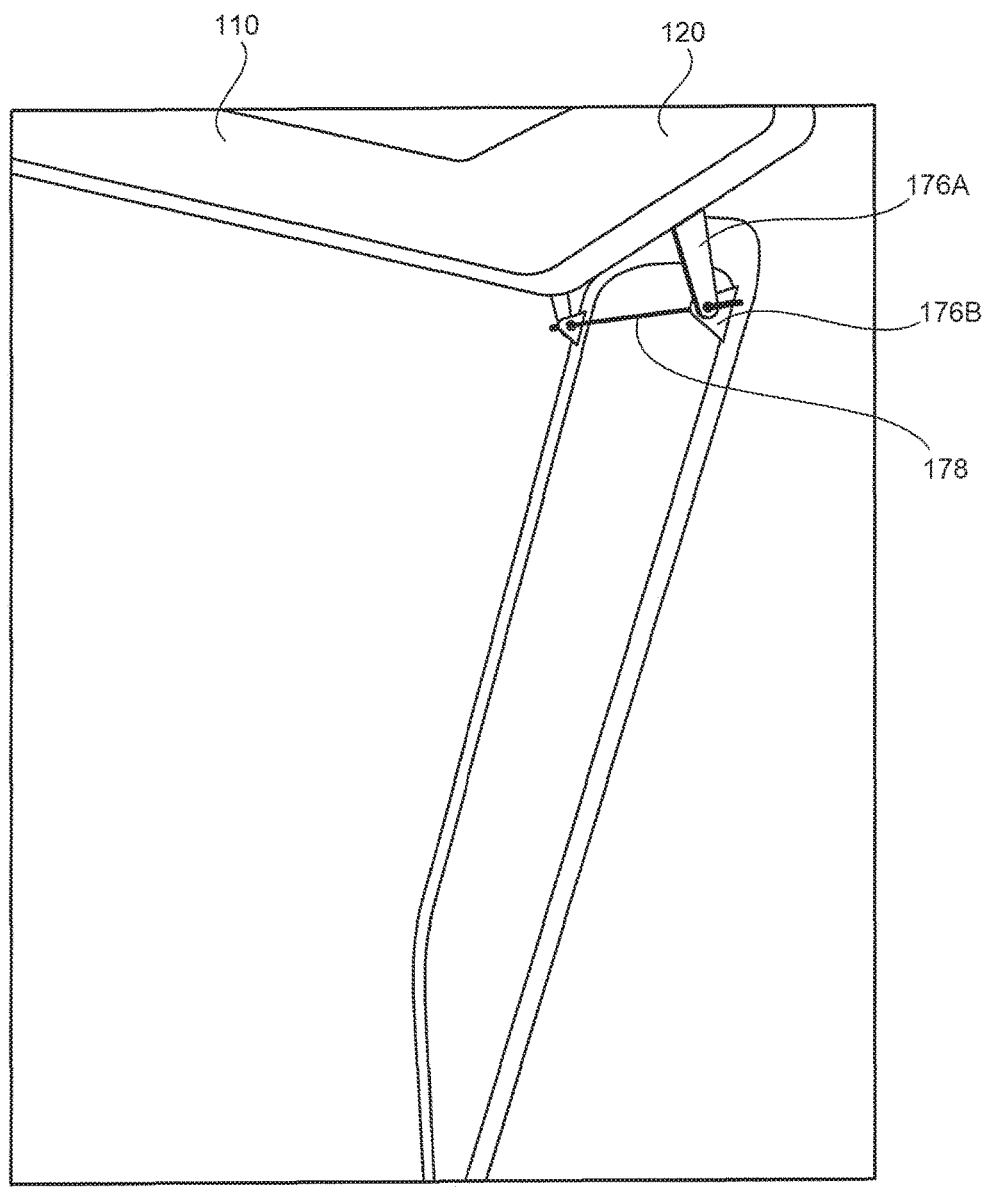
Figure 3C:
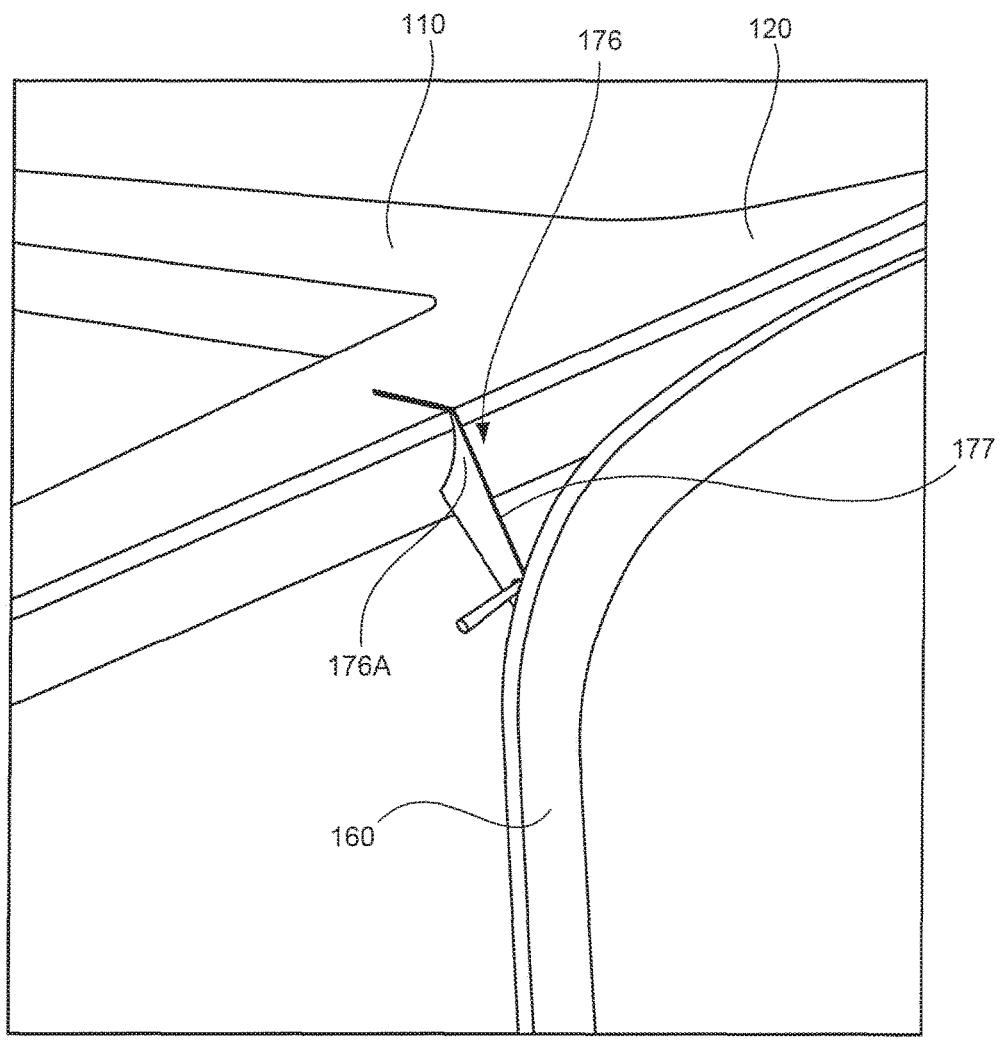

The screen 160 may be coupled to the quadcopter 150, and in particular, to the first arm 120, by a coupling device 170 having, for example, a hinge type structure, so that the screen 160 may be allowed some amount of movement, or rotation, relative to the first arm 120. An enlarged view of one example implementation of the coupling device 170 coupling the screen 160 to the first arm 120 is shown in FIGS. 3A-3C. The coupling device 170 may rotatably couple the screen 160 to the frame 155 of the quadcopter 150. In the example implementation shown in FIGS. 1 and 3A-3C, the coupling device 170 rotatably couples the screen 160 to the first arm 120 of the frame 155. As shown in the example of FIG. 3A, in some embodiments, the coupling device 170 may include, for example, a first hinge 172 coupling a first end portion of the screen 160 to the first arm 120, and a second hinge 174 coupling a second end of the screen 160 to the first arm 120. In other embodiments, more, or fewer individual hinges may be used to couple the screen to the body of the quadcopter 150, and position(s) of the individual hinge(s) may be varied based on a physical configuration of a particular implementation.

In some embodiments, each of the hinges 172, 174 may include, for example, a hinge bracket 176 having a first end coupled to the first arm 120, and a second end coupled to the screen 160. For example, in some embodiments, the hinge bracket 176 may include a first bracket 176A coupled to the first arm 120 of the quadcopter 150 and a second bracket 176B coupled to the screen 160. In some embodiments, the first bracket 176A may be fixed in its coupled position (e.g., fixedly coupled) relative to the first arm 120, and the second bracket 176B may be fixed in its coupled position relative to the screen 160. The first and second brackets 176A and 176B may be rotatably coupled to each other by a hinge shaft 178 that extends through mating ends of the first and second brackets 176A and 176B. In this example arrangement, with the first bracket fixed to the first arm 120 and the second bracket 176B fixed to the screen 160, the screen 160 may freely rotate relative to the first arm 120 about the hinge shaft 178.

Figure 4A:
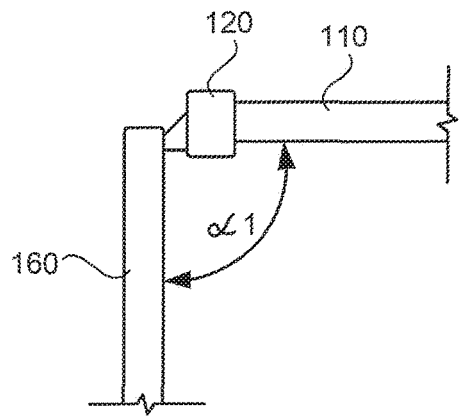
FIGS. 4A-4C are side views of orientation angles of a screen relative to a frame of the example quadcopter shown in FIG. 2, in accordance with embodiments as broadly described herein.
Figure 4B:
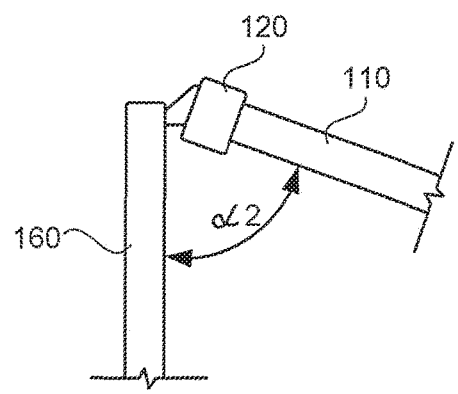
Figure 4C:
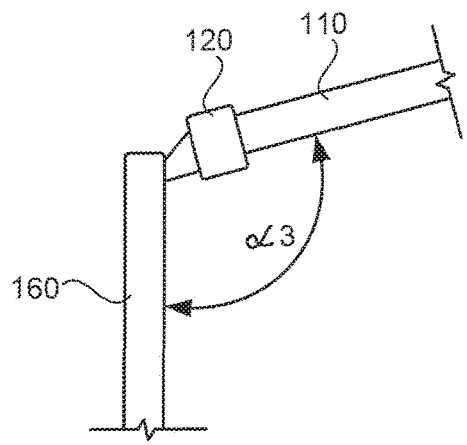

This rotation of the screen 160 relative to the frame 155 of the quadcopter 150 may allow the screen 160 to remain in a substantially vertical position as the orientation of the frame 155 of the quadcopter 150 changes during flight, and/or to move as necessary as the orientation of the quadcopter 150 changes during flight. That is, in some embodiments, during flight, the screen 160 may remain in a substantially vertical position, while the pitch of the quadcopter 150 (for example, an angle of the central body 110 of the quadcopter 150 relative to the horizontal, or the ground) may vary, thus varying an angle α between the screen 160 and the central body 110. For example, in a straight and level position, the frame 155 may be oriented substantially horizontally, with the forward end portion 155F and the aft end portion 155A of the frame 155 oriented substantially horizontally. As shown in FIG. 4A, in the straight and level position, the screen 160 may be oriented at an angle α1 with respect to a longitudinal axis of the quadcopter 150, such as, for example, a longitudinal axis defined by the central body 110. In a pitch up, or nose up, position, the forward end portion 155F of the frame 155 may be positioned higher than the aft end portion 155A of the frame 155, as shown in FIG. 4B, and the screen 160 may be oriented at an angle α2 with respect to the central body 110. In a pitch down, or nose down, position, as shown in FIG. 4C, the forward end portion 155F of the frame 155 may be positioned lower than the aft end portion 155A of the frame 155, and the screen 160 may be oriented at an angle α3 with respect to the central body 110.

Figure 5A:
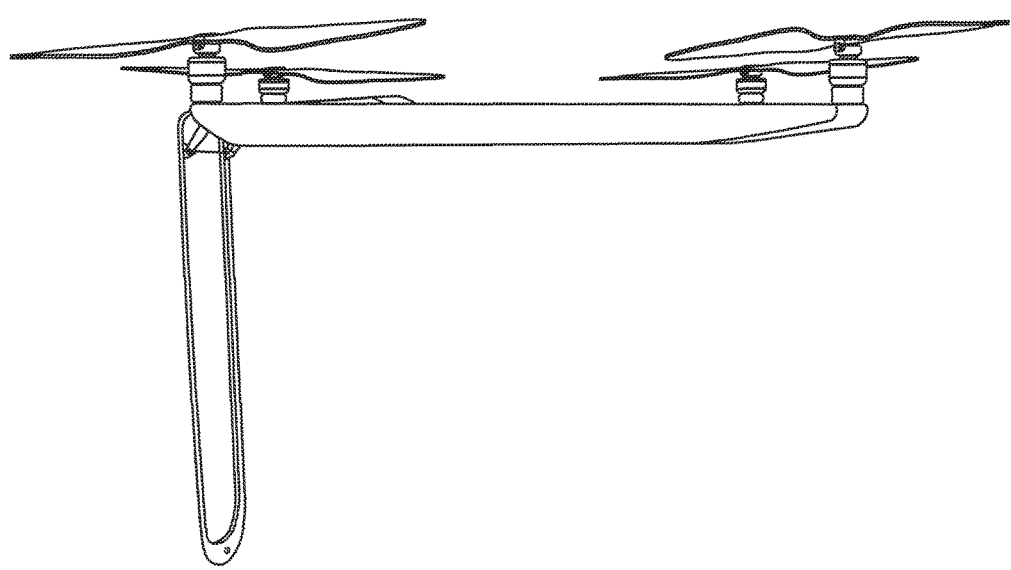
FIGS. 5A-5D illustrate various orientation angles of a screen relative to a frame of the example quadcopter shown in FIG. 2, in accordance with embodiments as broadly described herein.
Figure 5B:
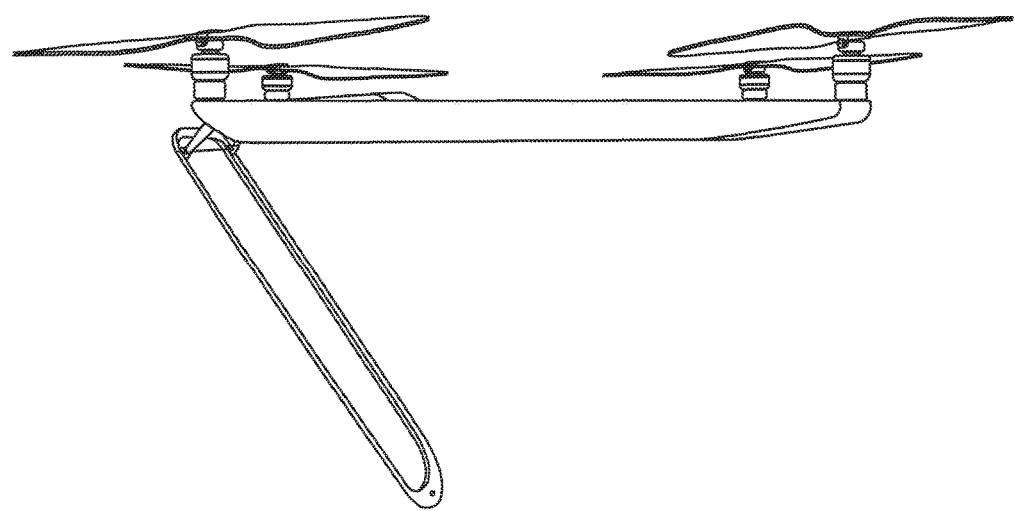
Figure 5C:
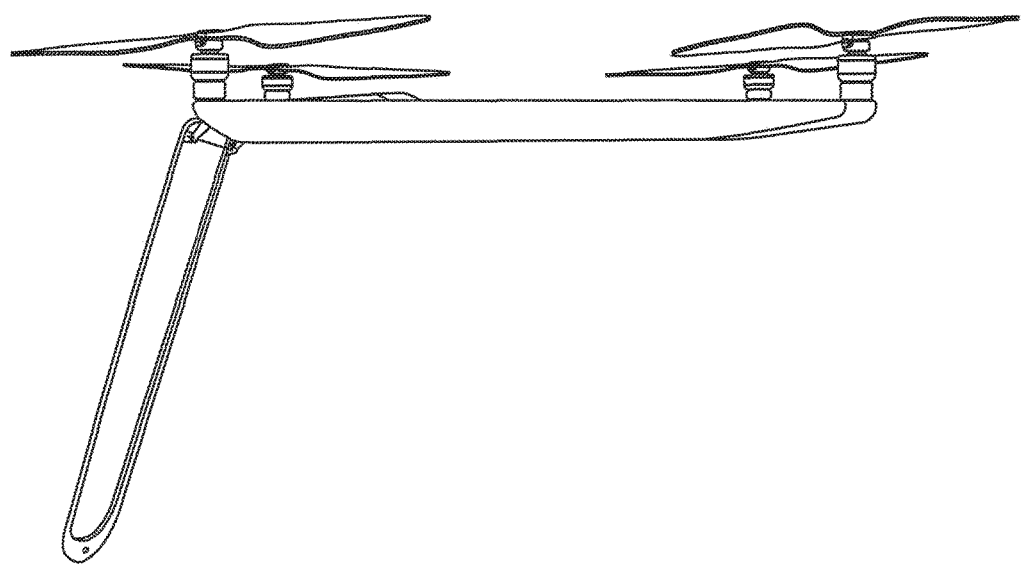

In some embodiments, during forward flight, the screen 160 may pivot from the neutral position shown in FIG. 5A to a rotated position shown in FIG. 5B This rotation of the screen 160 beyond the vertical, or neutral position, in the aft direction, in which the aft surface 160A of the screen 160 approaches the bottom surface of the central body 110, allows the screen 160 to move along with the quadcopter 150 such that the screen 160 does not add undue drat and inhibit mobility of the quadcopter 150. In some embodiments, a degree of upward rotation of the screen 160 in the forward direction, as shown in FIG. 5C, may be limited by, for example, a rotation limiting device which may limit an amount of rotation of the screen 160 relative to the first arm 120. For example, such a rotation limiting device may limit an amount of upward rotation of the screen 160, in the forward direction, relative to the first arm 120 to a predetermined amount of angular rotation, to prevent the screen 160 from rotating into the air flow path of the rotors 125A-125D, disrupting air flow and possibly impacting stability, and/or interfering with rotation of the rotors 125A-125D. For example, in some embodiments, the coupling device 170, and in particular, each of the hinges 172, 174 may include a limiting device to limit an amount of movement, and in this example embodiment, an amount of rotation of the screen 160 relative to the frame 155 of the quadcopter 150, and in particular, relative to the first arm 120.

Figure 5D:
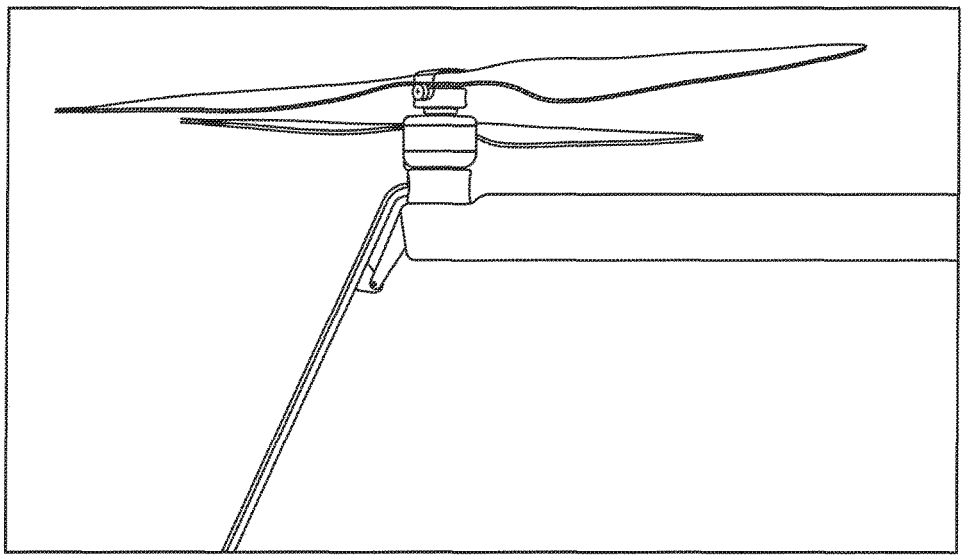

In the illustrated example, an amount of upward rotation of the screen 160 forward of the first arm 120 may be limited by a forward facing surface 177, or rotation limiting surface 177, of the first bracket 176A. For example, as the screen 160 rotates upward, in a forward direction, about the hinge shaft 178 (in a clockwise direction in the view shown in FIG. 3A), from the neutral position shown in FIG. 5A to the forward rotated position shown in FIG. 5C further rotation of the screen 160 may be impeded by contact between the aft surface 160A of the screen 160 in this direction and the forward facing surface 177 of the first bracket 176A, as shown in FIG. 5D. In the illustrated embodiment, the predetermined amount of upward rotation allowed by the forward facing surface 177 of the first bracket 176A may be established based on the angle and/or orientation of the forward facing surface 177 of the first bracket 176A which impedes further movement of the screen 160 through contact with the rear surface of the screen 160. As noted above, during forward flight, the screen 160 may freely rotate in the aft direction as shown in FIG. 5B, so that it does not act as a sail that impedes forward flight.

The example coupling device 170 described above is merely one example implementation of a coupling device which may couple a screen to the frame of a quadcopter, as embodied and broadly described herein, to provide for a predetermined amount of free movement and/or rotation of the screen relative to the quadcopter while the quadcopter is in flight, so that the screen does not hinder stability and maneuverability in flight. Other coupling devices such as, for example, one or more coupling rings, one or more rotary/swivel joints or ball and socket joints and the like may also provide the desired amount of movement (e.g., limited movement) of the screen 160 relative to the quadcopter 150. Additionally, the coupling device 170 shown in FIGS. 1 and 3A-3C includes two hinges attached at two opposite top end portions of the screen 160. However, a coupling device coupling the screen to the quadcopter, in accordance with embodiments as broadly described herein, may include fewer individual coupling devices, or more individual coupling devices than the illustrated embodiment, and positioning of such individual coupling device(s) may be varied based on a particular implementation. Other devices for limiting an amount of movement, or rotation, of the screen 160 relative to the first arm 120 of the quadcopter 150 may also be implemented, depending on a particular arrangement of the attaching structure and an amount of allowable relative movement.

In some embodiments, the screen 160 may be relatively rigid, so that the screen 160 remains relatively stable, with minimal flutter during flight of the quadcopter 150, so that the screen 160, and movement of the screen 160, does not affect stable flight of the quadcopter 150. The screen 160 may also be relatively light so that the weight of the screen 160 does not have an adverse affect on maneuverability and energy consumption. In some embodiments, the screen 160 may be made of, for example, a monolithic foam material in which a portion of the foam has been milled away to define a display area having a minimal thickness with a frame surrounding display area to provide rigidity. In some embodiments, the screen 160 may include a thin sheet of paper secured in a rigid frame. Other implementations may include other combinations of components and/or materials for the screen 160. In some embodiments, the screen 160, and in particular the display area of the screen 160, may include openings or perforations, allowing air to pass through the screen 160 during flight, reducing drag while also reducing weight. Such openings or perforations may be sized and arranged so that they are relatively imperceptible when an image is projected onto the screen 160, and so that they do not have a perceptible effect on image quality.

The example rotation limiting device, taken together with the example coupling device and example screen having a certain degree of rigidity, provides just one example implementation in which a position of the screen relative to the body of the quadcopter, and an amount of movement of the screen relative to the quadcopter during flight may be controlled so that the screen does not interfere with or otherwise impede stable flight and navigation of the quadcopter.

Figure 6A:
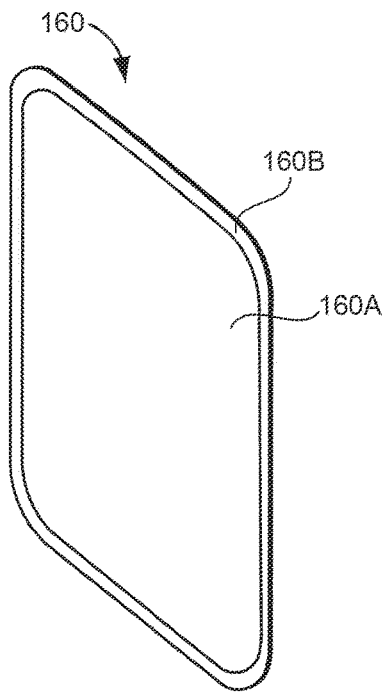
FIG. 6A is a perspective view.
Figure 6B:
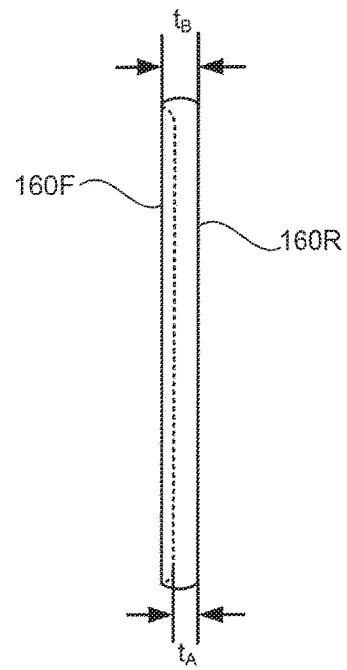
FIGS. 6B-6D are side views, of a screen of the example quadcopter shown in FIG. 2, in accordance with embodiments as broadly described herein.
Figure 6C:
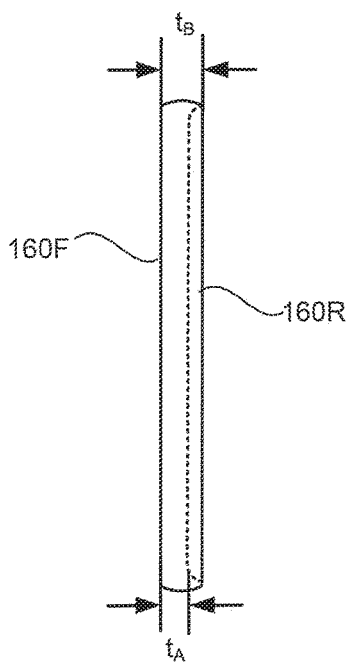
Figure 6D:
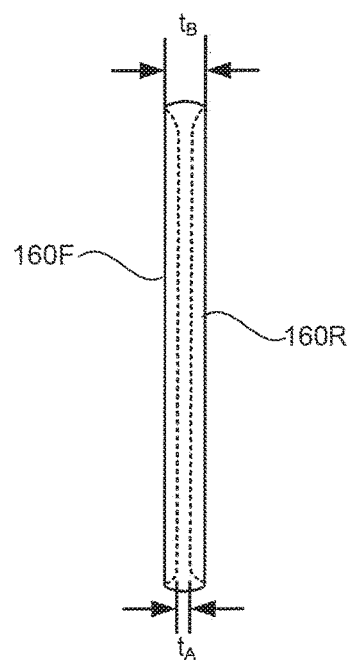

An example of a screen 160, in accordance with embodiments as broadly described herein, is shown in FIGS. 6A-6D. As described above, in one example implementation, the screen 160 may be made from a monolithic foam material. By milling the monolithic foam material, a display area 160D having a minimal thickness may be defined on the screen 160. In some embodiments, the display area 160D of the screen 160 may include openings or perforations to facilitate air flow therethrough during flight. The monolithic foam material may be milled so that a frame 160B, or border 160B, surrounds the thin display area 160D, as shown in FIG. 6A, to provide structural rigidity to the screen 160, with a thickness tB of the frame 160B being greater than a thickness tA of the display area 160A. In some embodiments, the display area 160A may be defined by a recessed area in a forward facing surface 160F of the screen 160, with the frame 160B surrounding the display area 160D, as shown in FIG. 6B. In some embodiments, the display area 160D may be defined by a recessed area in an aft facing surface 160A of the screen 160, with the frame 160B surrounding the display area 160D, as shown in FIG. 6C. In some embodiments, the display area 160D may be defined by a recess in both the forward facing surface 160F and the aft facing surface 160A of the screen 160, with the frame 160B surrounding the display area 160D, as shown in FIG. 6D.

In some embodiments, a transition area of the display 160 between the display area 160D and the frame 160B may be curved so as to define a gradual transition. In some embodiments, the transition area between the display area 160D and the frame 160B may be angular or stepped.

Figure 7A:
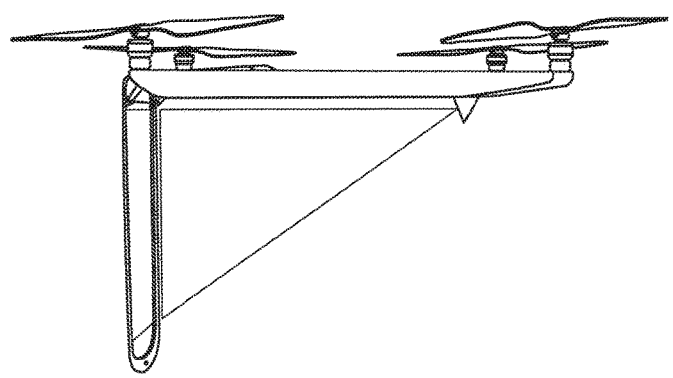
FIGS. 7A and 7B illustrate projection of an image onto a screen of the example quadcopter shown in FIG. 2, in accordance with embodiments as broadly described herein.
Figure 7B:
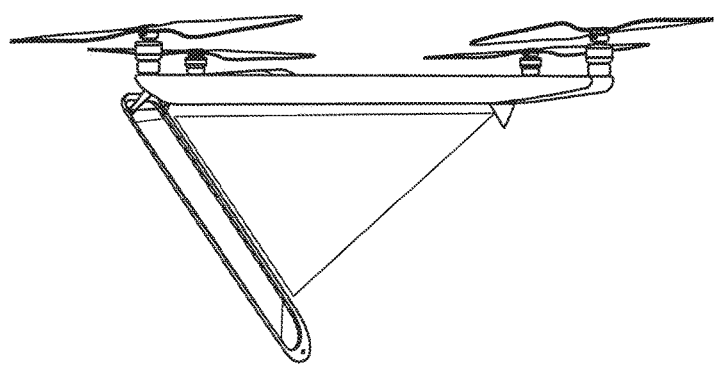

In some embodiments, a display surface of the display area 160A may be substantially planar. In some embodiments, as the screen moves, for example from the neutral position shown in FIG. 7A to the rotated position shown in FIG. 7B while the quadcopter 150 is in flight and the image output device 140 is projecting an image onto the screen 160, the image output device 140 may perform real time image correction as an orientation angle of the screen 160 varies during flight, so that an image displayed on the screen 160 does not appear distorted and/or out of proportion due to movement of the screen 160. For example, in some embodiments, instrumentation included at the coupling area between the screen 160 and the quadcopter 150, for example, in the area of the coupling device 170, may measure an orientation angle of the screen 160, substantially real time. Data indicating the orientation angle of the screen 160 may be transmitted to the image output device 140, substantially real time. The image output device 140 may then factor the screen orientation data into the image data to be displayed, substantially real time, so that the image projected by the image output device 140 onto the screen 160 is corrected, and not distorted due to movement of the screen 160.

In some embodiments, the image output device 140 may be movable, for example, movable in response to movement of the quadcopter 150 and/or the screen 160. For example, in some embodiments, the image output device 140 may be pivotably mounted and/or swivel mounted, or gimbal mounted on the frame 155 of the quadcopter 150. As the screen 160 moves in response to the movement of the quadcopter 150 (for example, during flight), the gimbal mounted image output device 140, and/or a projecting lens of the image output device 140, may move in a similar or corresponding manner so that an image projected onto the screen 160 maintains its shape within a predefined area, or shape, or periphery, such as an area or periphery defined by the display area 160A, so that the displayed image does not appear distorted to the viewer. In some embodiments, this movement of the image output device 140 to correspond to the movement of the screen 160 may be controlled based on, for example, data from a gyroscope in the mounting of the image output device, or other such instrumentation. In some embodiments, the image output device 140 may be mounted so that it is freely movable within a given range and within a given orientation. In some embodiments, the image output device 140 may be physically connected to the screen 160, so that, as the screen 160 moves, the image output device 140 also moves. In some embodiments, the image output device 140 may determine image size and focus based on a speed and/or directional orientation of the quadcopter 150.

In some embodiments, the image output device 140 itself may collect screen orientation data. That is, in some embodiments, an optical component of the image output device 140 may detect a distance between a set point of the image output device 140 and one or more set points on the screen 160 to detect an orientation of the screen 160, substantially real time. This optical component may include, for example, a camera configured to capture an image of a marker on the screen 160 and determining an orientation of the screen 160 based on a size of the marker in the image, and other such systems which may be included in the image output device 140.

Figure 8:
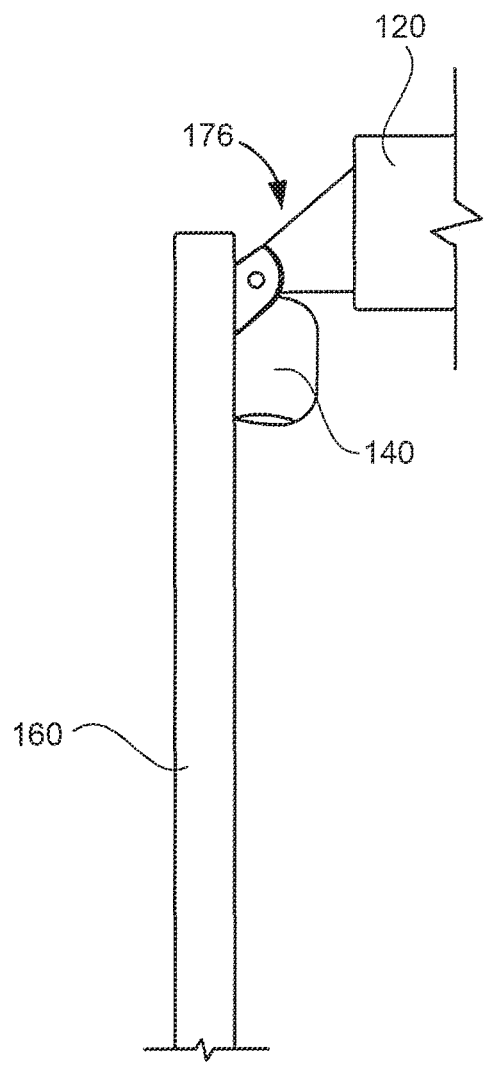
FIG. 8 is a side view of a coupling for a screen and an image output device to a frame of a quadcopter, in accordance with embodiments as broadly described herein.

In the example implementation shown in FIG. 2, the image output device 140 is located at the aft end portion 155A of the quadcopter 150, so that images generated by the image output device 140 may be projected onto the screen 160 from the rear of the screen 160, the screen 160 being positioned at the forward end of the quadcopter 150, spaced apart from the image output device 140. However, in some embodiments, the image output device 140 may be positioned at a different location on the quadcopter 150, such as, for example, closer to the screen 160. For example, in some embodiments, the image output device 140 may be positioned at or near the top end of the screen 160, so that a variation in orientation angle of the screen 160 has little to no effect on the quality of an image projected onto the screen 160 by the image output device 140. For example, as shown in FIG. 8, the image output device 140 may be coupled to the top end of the screen 160, and may project an image down, onto the screen 160. In some embodiments, the screen may be coupled to other portions of the screen 160. For example, the screen 160 may be coupled to a bottom end of the screen 160, and may project an image up, onto the screen 160, or may be coupled to a right or left lateral side of the screen 160 to project an image onto the screen 160. In this arrangement, with the image output device 140 coupled to the screen 160, as the screen 160 moves, the image output device 140 moves together with the screen 160, so that there is little to no distortion of the projected image, regardless of the orientation angle of the screen 160, reducing and/or eliminating the need for additional image correction prior to projection of the image.

Figure 9:
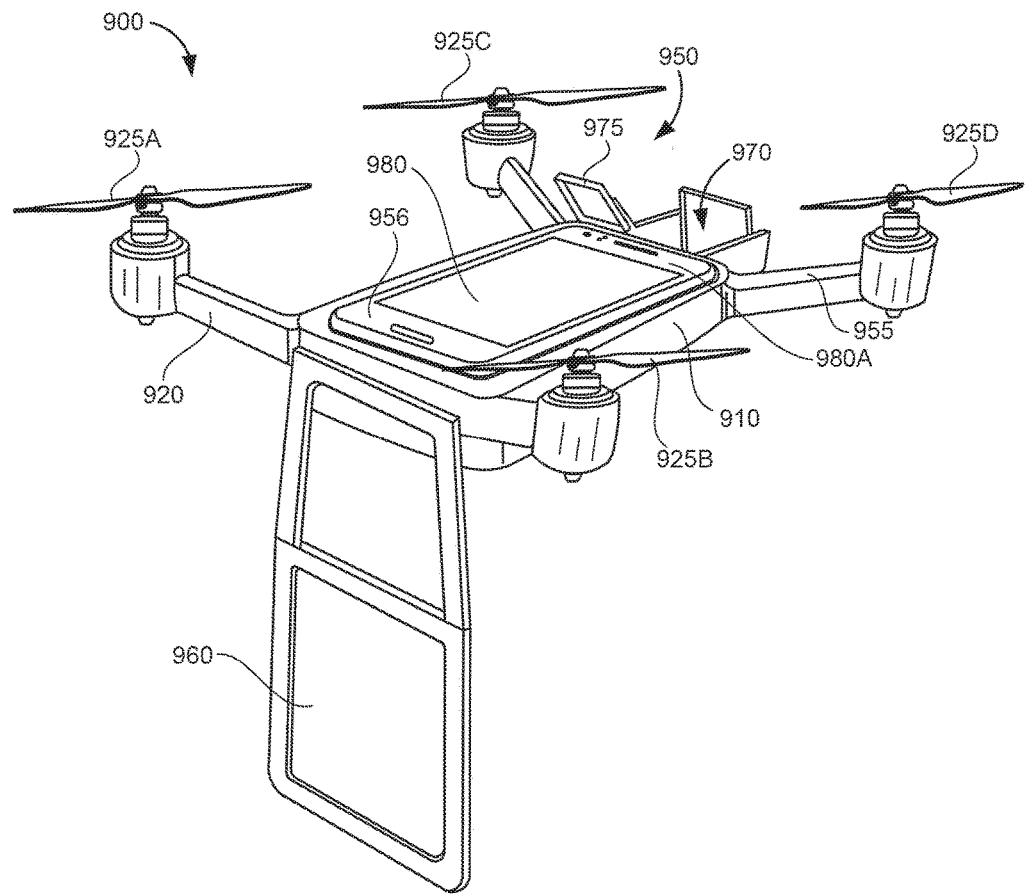
FIG. 9 is a perspective view of a mobile telepresence system, in accordance with embodiments as broadly described herein.

FIG. 9 is a perspective view of a mobile telepresence system 900 in accordance with another embodiment as broadly described herein. In the embodiment shown in FIG. 9, the telepresence system 900 includes various audio and video communication components that are mounted on and/or coupled to and/or integrated into a quadcopter 950. The quadcopter 950 may include, for example, a frame 955 including a central body 910, a first arm 920, at a first, or forward, end of the central body 910, and a second arm 930, at a second, or aft, end of the central body 910. A propulsion system, including, for example, a plurality of rotors/propellers 925A, 925B, 925C and 925D mounted at opposite end portions of the first and second arms 920 and 930, may provide a propulsive force for movement of the quadcopter 950. Variation in rotative force, blade pitch, and/or hub pitch of the rotors 925A-925D may control speed and direction of the quadcopter 950.

A docking station 956 may be included on the frame 955, for example, at a central portion of the frame 955, in the central body 910. This docking station 956 may receive a mobile electronic device, such as, for example, a smartphone 980 as shown in this example implementation, capable of two way audio communication and two way video communication. Thus, in this embodiment, the smartphone 980 combined with the docking station 956 may together provide for processing and control of the quadcopter 950, as well as for audio and/or video capture and output. For example, in some embodiments, the smartphone 980 may receive images from the user at the remote location, and may project the received images through a projector included with the smartphone 980, for example, an end portion 980A of the smartphone 980. The image projected by the smartphone 980 may be reflected by a first mirror 970 and projected onto a screen 960. A second mirror 975 may capture an image from within the room and reflect the captured image to a camera of the smartphone 980. The smartphone 980 may transmit the captured image back to the remote user. Similarly, audio inputs received by the smartphone 980 from the remote user may be output through a speaker of the smartphone 980, and audio inputs from participants in the room may be captured by a microphone of the smartphone 980 and transmitted back to the remote user by the smartphone 980. Thus, the example mobile telepresence system 900 shown in FIG. 9 may be capable of providing two way audio communication and two way video communication without the use of a separate image output device (or projector), screen, image input device (or camera) and audio input device (or microphone).

In some embodiments, the first mirror 970 may receive an image from a projector included on the quadcopter 950 that is separate from the smartphone 980, and reflect the received image for projection on the screen 960.

Figure 11:
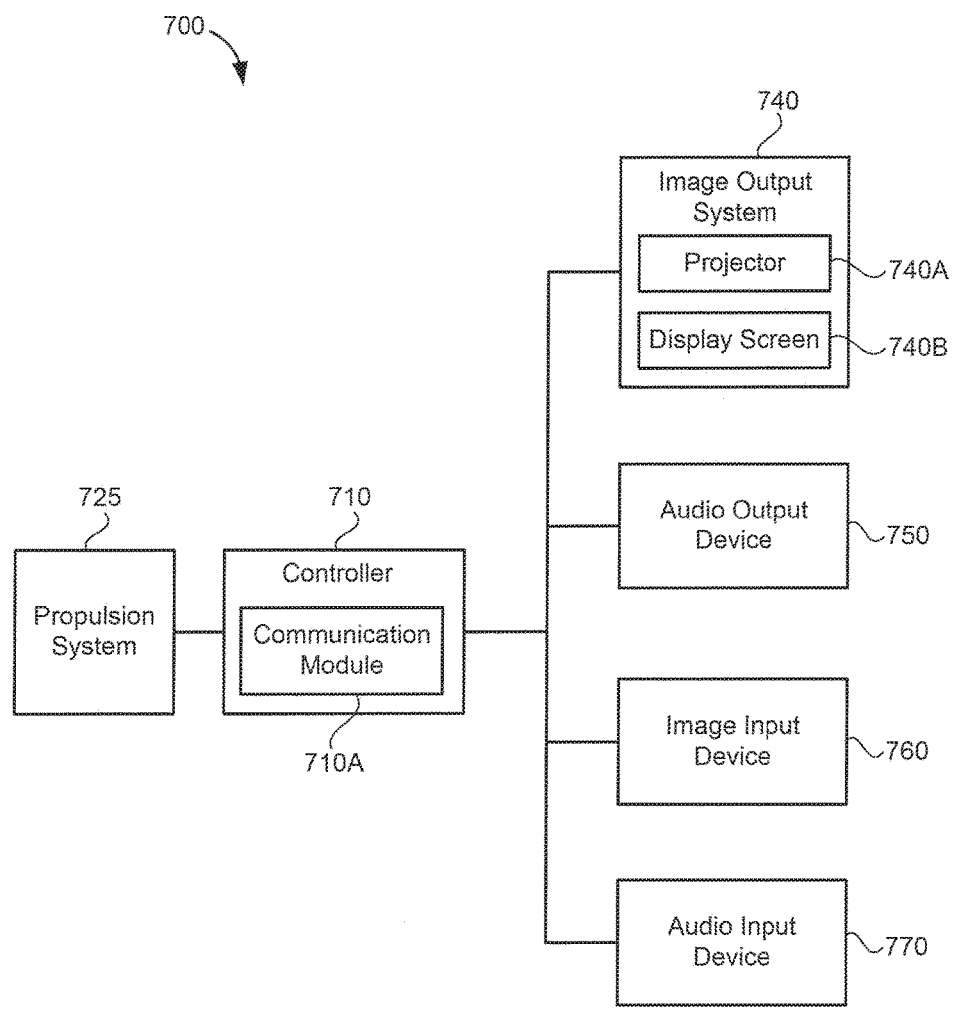
FIG. 11 is a block diagram of a mobile telepresence system, in accordance with embodiments as broadly described herein.

FIG. 11 is a block diagram of a mobile telepresence system, in accordance with embodiments as broadly described herein. As shown in FIG. 11, the mobile telepresence system 700 may include a propulsion system 725 mounted on the mobile system platform to provide for mobility of the mobile telepresence system 700, including navigation of the mobile telepresence system 700 to and within a designated location by a user at a remote location. The propulsion system 725 may include, for example, a plurality of rotors as shown in the example implementation of FIG. 2. The remote user may control navigation of the platform by remotely controlling the propulsion system 725, using a communication channel established by a communication module 710A of a controller 710. An image output system 740 may generate and display images of the remote user, the remote user being at a location that is different from, or remote from the designated location. The image output system 740 may include, for example, a an image output device 740A, or projector 740A, which receives images from the remote user via a communication module 710A of a controller 710, and a display 740B on which the projector 740A may project the received images. The images may be still images, or may be moving images corresponding to a video feed received from the remote user at the remote location via the communication module 710A. The received images may be displayed on the display 740B to users at the designated location. An audio output device 750 may output an audio feed received from the remote user via the communication module 710A. In some embodiments, the audio feed, or audio signal, may be synchronized with the video feed from the remote user at the remote location. An image input device 760, such as, for example, a camera, may capture still and/or moving images at the designated location, and an audio input device 770, such as, for example, a microphone, may capture audio inputs at the designated location. The still and/or moving images and/or the audio inputs may be transmitted from the designated location to the remote user at the remote location via the communication module 710A. The image output system 740, audio output device 750, image input device 760 and audio input device 770, working with the communication module 710A, may provide for two way audio and video communication between the remote user at the remote location and participant(s) located at the designated location. In some embodiments, the image output system 740, the audio output device 750, the image input device 760, and/or the audio input device 670 may be included in a single system or device.

Figure 10B:
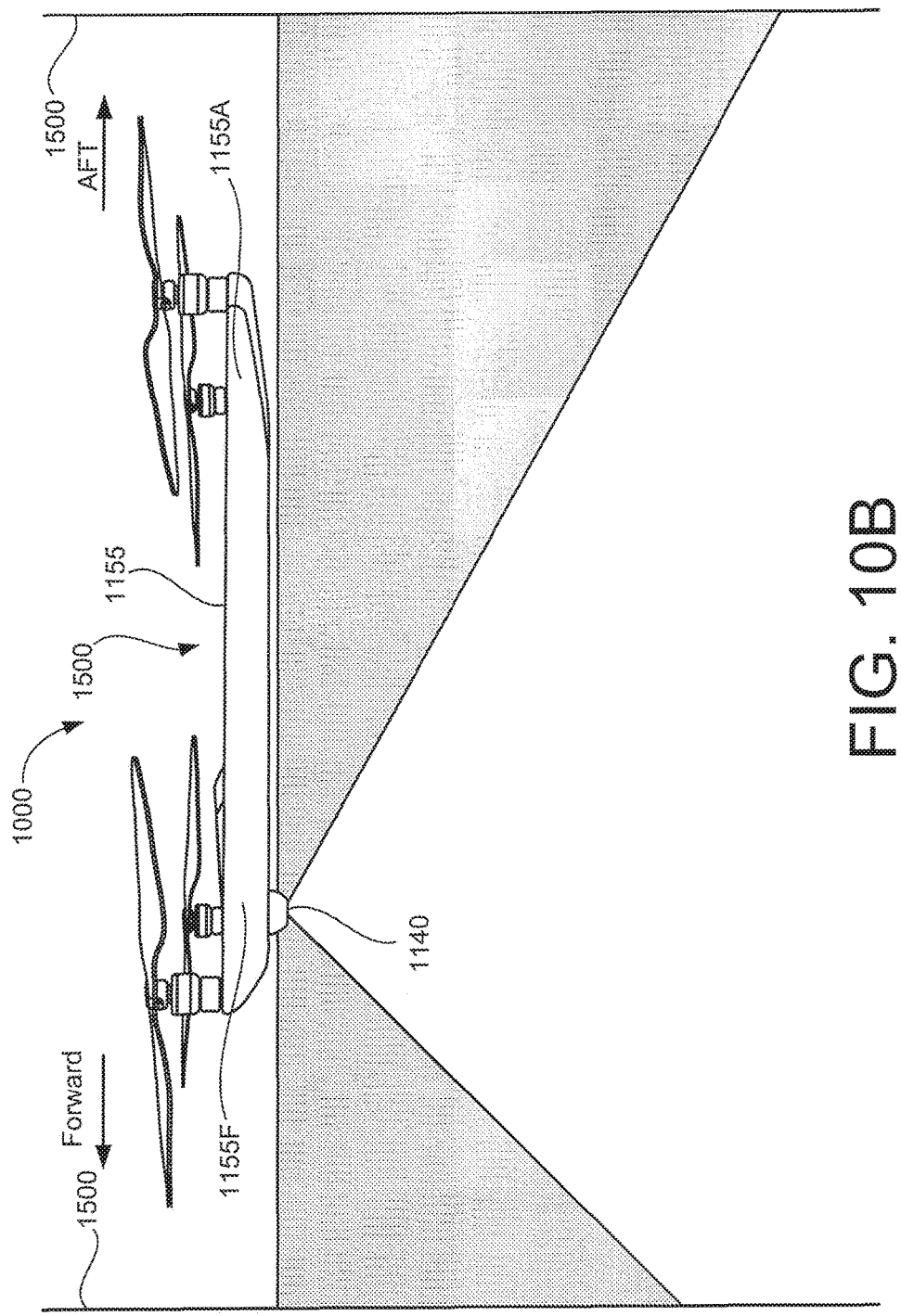

In some embodiments, a mobile telepresence system implemented on a remotely navigated airborne platform, such as, for example, a quadcopter as described above, may be equipped to project still and/or moving images onto a wall or screen available in the designated location. For example, as shown in FIGS. 10A-10B, a mobile telepresence system 1000, in accordance with embodiments as broadly described herein, may include an image output device 1140 on a remotely navigated quadcopter 1150. The image output device 1140 may be mounted at various different locations on the quadcopter 1150 that allow an image projected by the image output device 1140 to be projected onto a surface 1500 already available in the meeting space, such as, for example, a wall surface or a projection screen available in the meeting space, without being obstructed by other component(s) of the quadcopter 1150. For example, the image output device 1140 may be mounted at an aft portion 1155A of a frame 1155 of the quadcopter 1150 as shown in FIG. 10A, or at a forward portion 1155F of the frame 1155 of the quadcopter 1150 as shown in FIG. 10B, or various other locations on quadcopter 1150 that allow for unimpeded projection of images onto the surface 1500 in the room. In some embodiments, the image output device 1140 may be movably mounted, such as, for example, gimbal mounted, allowing for essentially 360° adjustment of the projection direction, so that the projection direction may be varied based on an orientation of the quadcopter 1150 and a position of the available projection surface 1500 in the room. The examples shown in FIGS. 10A and 10B illustrate projection by the image output device 1140 in a forward direction and in an aft direction. However, the image output device 1140 may be capable of projection in numerous other directions based on a movable mounting arrangement of the image output device 1140 and/or projection components thereof. In some embodiments, the image output device 1140 may project onto the projection surface 1500 in the room while in flight, as well as when received on a perching device.

Herein, implementation and use of a mobile telepresence system has been described in terms of a meeting in a workplace, simply for ease of discussion and illustration. However, various implementations of a mobile telepresence system, as embodied and broadly described herein, may also apply to other venues, such as, for example, a medical professional consulting with a patient and/or another medical professional at a different location, an instructor providing instruction to student(s) at remote location(s), and the like. Benefits of a telepresence system, as embodied and broadly described herein may include, for example, reductions in travel expenses, reductions in environmental impacts, improved coordination and productivity, and the like.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

What is claimed is:

1. An aerial vehicle comprising:
   a frame;
   a propulsion system coupled to the frame and configured to propel the aerial vehicle in response to a command from a remote device;
   a screen pivotably coupled to the frame;
   an image output device movably mounted to the frame, wherein the image output device is configured to project an image onto the screen; and
   a controller configured to:
   operate a communication module to communicate with the remote device.

2. The aerial vehicle of claim 1, wherein the propulsion system includes a plurality of rotors each coupled to a respective portion of the frame.

3. The aerial vehicle of claim 1, further comprising a coupling device that pivotably couples the screen to a forward end of the frame.

4. The aerial vehicle of claim 3, wherein the coupling device includes at least one hinge, the at least one hinge comprising:
   a first bracket fixed to the forward end of the frame;
   a second bracket fixed to a top end of the screen;
   a shaft extending through the first bracket and the second bracket to couple the first bracket and the second bracket such that the screen is rotatable about the shaft relative to the forward end of the frame; and
   a stop mechanism that limits an amount of rotation of the screen about the shaft to within a predetermined range.

5. The aerial vehicle of claim 4, wherein, in a neutral position the screen is oriented substantially vertically, and in a first position the screen is rotated in a first direction about the shaft such that a rear facing surface of the screen is rotated toward a bottom surface of the frame and positioned at a first side of the neutral position, and in a second position the screen is rotated in a second direction about the shaft, the second direction being opposite the first direction, such that a forward facing surface of the screen is rotated upward and positioned at a second side of the neutral position, and wherein the predetermined range is between the first position and the second position.

6. The aerial vehicle of claim 5, wherein air flow during flight of the aerial vehicle causes the screen to rotate within the predetermined range so that the screen aligns itself in an aerodynamic position.

7. The aerial vehicle of claim 1, wherein the screen has a unitary structure made of a foam material, including a semi-translucent, perforated display area surrounded by a rigid outer frame, a thickness of the display area being less than a thickness of the rigid outer frame, and wherein air can flow through the perforated display area during flight of the aerial vehicle.

8. The aerial vehicle of claim 1, further comprising a speaker configured to output audio based on audio data, and wherein the image output device comprises a projector configured to project the image based on image data.

9. The aerial vehicle of claim 8, wherein the controller is further configured to:
   control the projector and the speaker to output in real-time audio data and image data associated with a remote location, wherein the audio data and image data is received from the remote device via the communication module.

10. The aerial vehicle of claim 1, further comprising:
    a microphone configured to receive an audio input; and
    a camera configured to capture an image input.

11. The aerial vehicle of claim 10, wherein the controller is further configured to:
    control the communication module to transmit in real time image inputs received by the camera at a current location and audio inputs received by the microphone at the current location to the remote device located at a remote location, wherein the remote location is different from the current location.

12. The aerial vehicle of claim 11, wherein the image output device is further coupled to the screen such that the image output device moves in response to movement of the screen.

13. An aerial vehicle comprising:
    a frame;
    a propulsion system operably coupled to the frame and configured to propel the aerial vehicle in response to a command from a remote device;
    a docking station configured to receive a mobile electronic device, wherein the mobile electronic device is configured to display a first image; and
    a first mirror movably coupled to the frame, wherein the first mirror is arranged to reflect the first image displayed by mobile electronic device towards a surface.

14. The aerial vehicle of claim 13, further comprising:
    a second mirror movably coupled to the frame, wherein the second mirror is arranged to reflect a second image, from an environment of the aerial vehicle, towards an image capturing component of the mobile electronic device.

15. The aerial vehicle of claim 13, wherein a speaker of the mobile electronic device outputs audio based on audio data, and wherein a microphone of the mobile electronic device receives an audio input from the environment of the aerial vehicle.

16. The aerial vehicle of claim 13, further comprising a projector configured to project a second image onto the first mirror such that the first mirror reflects the second image towards the surface.

17. A method comprising:
    operating an image output device coupled to an aerial vehicle to project an image onto a surface;
    measuring in real-time an orientation of the surface with respect to the image output device;
    determining, based on the measured orientation, that the image projected onto the surface is distorted;

in response to determining that the image is distorted, determining in real-time an adjustment to the image output device at which the image is not distorted on the surface; and adjusting the image output device according to the determined adjustment.

18. The method of claim 17, wherein the image output device is coupled to the aerial vehicle via an adjustable coupling mechanism, wherein determining in real-time an adjustment to the image output device comprises determining an orientation of the image output device at which the image is not distorted on the surface, and wherein adjusting the image output device comprises adjusting the adjustable coupling mechanism to orient the image capturing device at the determined orientation.

19. The method of claim 17, wherein determining in real-time an adjustment to the image output device is further in response to detecting a movement of the surface.

20. The method of claim 17, wherein determining based the measured orientation that the image is distorted on the surface comprises determining based on the measured orientation that an area of the image on the surface is larger than a predetermined area.

* * * * *